United States Patent [19]

Rosborough, Jr. et al.

[11] 4,293,215

[45] Oct. 6, 1981

[54] PRINT INSPECTION AND PACKAGING METHOD AND APPARATUS

[75] Inventors: Robert S. Rosborough, Jr., Rochester, N.Y.; Luther M. Wright, deceased, late of Brockport, N.Y., by Edna B. Lang, nee Wright executrix

[73] Assignee: Eastman Kodak Company, Rochester, N.Y.

[21] Appl. No.: 66,760

[22] Filed: Aug. 15, 1979

[51] Int. Cl.³ .................... G03B 27/52

[52] U.S. Cl. .................... 355/40; 355/77

[58] Field of Search .................... 355/13, 18, 28, 29, 355/32, 38, 40, 41, 44, 45, 64, 68, 77, 88; 250/559, 562, 563; 53/55

[56] References Cited

U.S. PATENT DOCUMENTS

| | | | |
|---|---|---|---|
| 3,454,336 | 7/1969 | Wick et al. | 355/29 |
| 3,516,741 | 6/1970 | Thaddey | 355/38 X |
| 3,576,369 | 4/1971 | Wick et al. | 355/77 |
| 3,718,807 | 2/1973 | Bracken et al. | 355/13 X |
| 3,768,903 | 10/1973 | Steinberger et al. | 355/41 X |
| 3,768,905 | 10/1973 | Williams | 355/77 |
| 3,873,201 | 3/1975 | Amano | 355/38 X |
| 4,008,962 | 2/1977 | Nepper | 355/32 X |
| 4,039,258 | 8/1977 | Hujer et al. | 355/38 X |
| 4,043,667 | 8/1977 | Machida | 355/88 X |
| 4,065,661 | 12/1977 | Jaskowsky | 355/6 X |
| 4,115,981 | 9/1978 | Hell et al. | 53/55 |

FOREIGN PATENT DOCUMENTS 1456178 11/1976 United Kingdom .

OTHER PUBLICATIONS

Product Description of "Pakomp II Photopacker".
Product Description of "CX Systems", Equipment including Autopax II.
Photographic Processing "To Computerize or not–Do Finishers Still have a Choice", Robert S. Bremson II.

*Primary Examiner*—Richard A. Wintercorn
*Attorney, Agent, or Firm*—D. M. Woods

[57] ABSTRACT

Apparatus and method are disclosed for synchronously processing photographic prints and corresponding negatives through an inspection and packaging operation. Initially, a file of printing history data is compiled on magnetic storage in a central computer system when the prints are originally exposed in sequence of customer order by a photographic printer. After the photographic print material is processed, the prints and negatives are delivered to the inspection and packaging apparatus in roll form while the corresponding printing history is withdrawn from magnetic storage. The inspection and packaging apparatus chops the prints and places each print in an identifiable position upon a moving inspection belt. By beginning the process with the prints, the negatives and the history file in corresponding sequence, the negative-related history data is correlated to the identifiable positions in which corresponding prints are placed. Then, by referring to a position identifier, an inspector may select a print for correction and automatically have access to all history data for that negative—such as negative frame identification and original printing data. As corrections are made by the inspector, a new data file is constructed for makeovers belonging to each order. If an order has conforming prints, it is immediately packaged for shipment to the customer. For orders having nonconforming prints, the make-over data and corresponding negatives are returned to a printer which automatically corrects the observed nonconformity in the prints. The corrected prints are then combined with the remaining prints in the order and returned to the customer.

16 Claims, 16 Drawing Figures

PRINT INSPECTION AND PACKAGING METHOD AND APPARATUS

BACKGROUND OF THE INVENTION

1. Field of the Invention

The present invention relates to inspection and packaging of photographic prints and negatives. More specifically, the present invention is concerned with integrating normally separate operations by utilizing data generated during photographic printing for correlating negatives and prints during inspection and packaging. Moreover, the preparation of make-over prints in place of nonconforming prints is facilitated by automatically generating instructions for correcting the nonconformity at a make-over printing operation.

2. Description of the Prior Art

Generally speaking, it has been customary to separate the inspection of photographic prints from operations involving the cutting, sorting and packaging of the prints. To achieve full roll inspection, the prints on the uncut developed paper web roll are unreeled from a take-off spindle, past an inspection station and back into roll form upon a take-up spindle. The inspector, positioned at the inspection station, observes the passing prints for out of standard conditions—such as objectionable color or density effects, blank frames, blurred or otherproblems causing displeasing pictures. The prints are marked for the type of problem with, e.g., a marking pen. Prints having color or density problems are identified for subsequent correction while the other prints are marked for discarding only. Sometimes described as 'unprintable', the latter prints possess displeasing defects that the photofinisher cannot correct, e.g., extreme over- and under-exposure, blank frames, blurred scenes caused by camera movement, etc.

The inspected roll is next queued into a completely separate cutting, sorting and packaging workplace. Here, an operator—or automatic sensors—observe the markings and segregate the orders with marked prints for separate handling. 'Unprintable' prints are simply discarded. The 'passed' orders, i.e., those with unmarked prints, are cut, assembled and packed up for shipping. Make-over orders, i.e., those prints marked with correctible problems, are gathered together and sent back for printing of the negatives that produced the problem prints, this time taking the suggested corrections into account.

A typical finishing work center of the above type is described in U.S. Pat. No. 3,718,807. An automatic print cutter and sorter cuts and sorts prints (supplied in roll form) until an order sort mark is sensed on the last print of a customer's order. Then the print cutter stops. Simultaneously, an automatic film cutter and stacker cuts and stacks the negative roll film into filmstrips (each filmstrip having three to five negative frames) until the splice is sensed between customer orders. Then the film cutter stops. If all the prints are acceptable, the operator gathers the prints and negative filmstrips, stuffs them into respective pockets of an envelope and routes the envelope for shipping. Unacceptable prints are marked with dull, light-absorbing marks placed upon them by a print inspector in a prior operation (e.g., full roll inspection). Sensors on the finishing work center sense these marks and cause the marked prints to be shunted aside for separate handling by the operator. Simultaneously, a filmstrip correlator illuminates a number indicating the filmstrip (of the four or five in the customer's order) that contains the negative frame from which the marked print was made. The correlator bases its decision on the number of chopped prints from the beginning of the customer's order. Since it has no prior knowledge of the negative frame numbers, it can resolve negative identity only to the point of estimating the film strip—not the frame—from which the 'marked' print was made. If several negatives were skipped by the printer, the correlator will have no way of knowing this and will signal the wrong film-strip.

In some professional-grade photofinishing operations, sophisticated customer expectations dictate a high frequency of make-overs since quality level is crucial to professional needs. To centralize and control quality, such photofinishers are known to integrate inspection and packaging in one manual workplace; in effect productivity tends to give way to a higher level of assurance that problems are being detected and correctly diagnosed. Careful inspection tends to slow overall packaging output since each nonconforming print (which the inspector sees) must be associated with its corresponding negative to derive identifying information. This is done by visually scanning the negative image—as by holding the negative strip up to light—and matching the nonconforming print with the correct negative. Once the negative is located, the operator notes the frame number and corrections on an auxiliary sheet of paper that accompanies the order back to the printer for making over.

Besides manually transcribing the print corrections, there are other methods for preparing selected prints for reprinting or remaking. For example, U.S. Pat. No. 4,008,962 describes a record-keeping system for a grahic arts printer. Manually adjusted parameters (e.g., amount of colored material to be transferred to the copy) for making the color print are automatically punched into a data processing card when the original print is made. The card may then be used to set up the printer later on for exact copy reprints. However, this system does not provide for correction of the original print. U.S. Pat. No. 3,454,336 applies like concepts to a photographic printer where make-over correction is desirable. During the initial pass through printing, the color printer transfers a customer code number and negative serial number to each color print. Then, when a nonconforming print is detected during inspection, the inspector enters the code number, the serial number and the proper correction into a correction tape. The tape automatically directs a printer to skip the good frames and remake the negatives that yielded the nonconforming prints. While automating the make-over printer, the foregoing apparatus remains dependent on the manual transcription of data at inspection from the print to the correction tape. Moreover, the amount of information carried from printing is dependent upon how much printer 'clutter' may be tolerated on the customer print.

Available inspection methods and apparatus have been unable to resolve the exact identity of a negative frame without human intervention to directly determine the negative, either by manually comparing a strip of negatives with selected prints or by reading a serial number on the back of the prints. If the inspection and packaging apparatus were to know precisely what the printer has done with each negative, greater reliability in matching negatives-to-prints would be possible. Moreover, the instructions for the make-over printer could be automatically generated from the printer data with only the addition of corrections. Tedious matching of prints with negatives—or the verification of tentative matches—could be entirely eliminated. It is to these ends that the present invention is addressed.

SUMMARY OF THE INVENTION

In accordance with the invention, apparatus and method are provided for correlating photographic prints with corresponding negatives by using negative-related information that is generated during the initial printing of negatives. The prints are placed in a plurality of identifiable positions; the negative-related information is received and correlated with the identifiable positions in which corresponding prints are positioned. Each print is then addressed by reference to the identifier associated with its position. When a particular print is selected, a selection signal is generated representative of the position of the print. The selection signal correlates the negative-related information to the selected position thus relating the selected print to its negative.

More particularly, the invention provides method and apparatus for use in an inspection operation where particular prints made from corresponding negatives are selected for correction due to observable nonconformity in the prints. The inspection work place includes a plurality of identifiable positions. The uninspected prints and the negative-related information are received in matched sequence such that the prints occupy identifiable positions that are synchronized with information corresponding to the negatives from which the prints were made. The inspector has but to identify a position and information regarding the negative is immediately accessible. The information is of use in automatically identifying the negative that produced the nonconforming print, therefore releasing the inspector of the burdensome task of searching through the negative strip to identify the frame that needs correction. The information is further of use in generating instructions for automatically controlling a photographic printer to correct problems noted in the negatives.

Moreover, the correlated information is useful in synchronizing the processing of prints and negatives in a packaging workplace. Signals representative of the matched negatives and prints cause apparatus to synchronously dispense the negatives and corresponding matched prints to the packaging station where the corresponding negatives and prints are packaged in the same container.

BRIEF DESCRIPTION OF THE DRAWINGS

The invention will be described with reference to the figures, wherein.

DETAILED DESCRIPTION OF THE INVENTION

Because automatic packaging apparatus is well known, the present description will be directed in particular to elements forming part of, or cooperating more directly with, apparatus in accordance with the present invention. Packaging elements not specifically shown or described herein may be selected from those known in the art.

Figure 1:
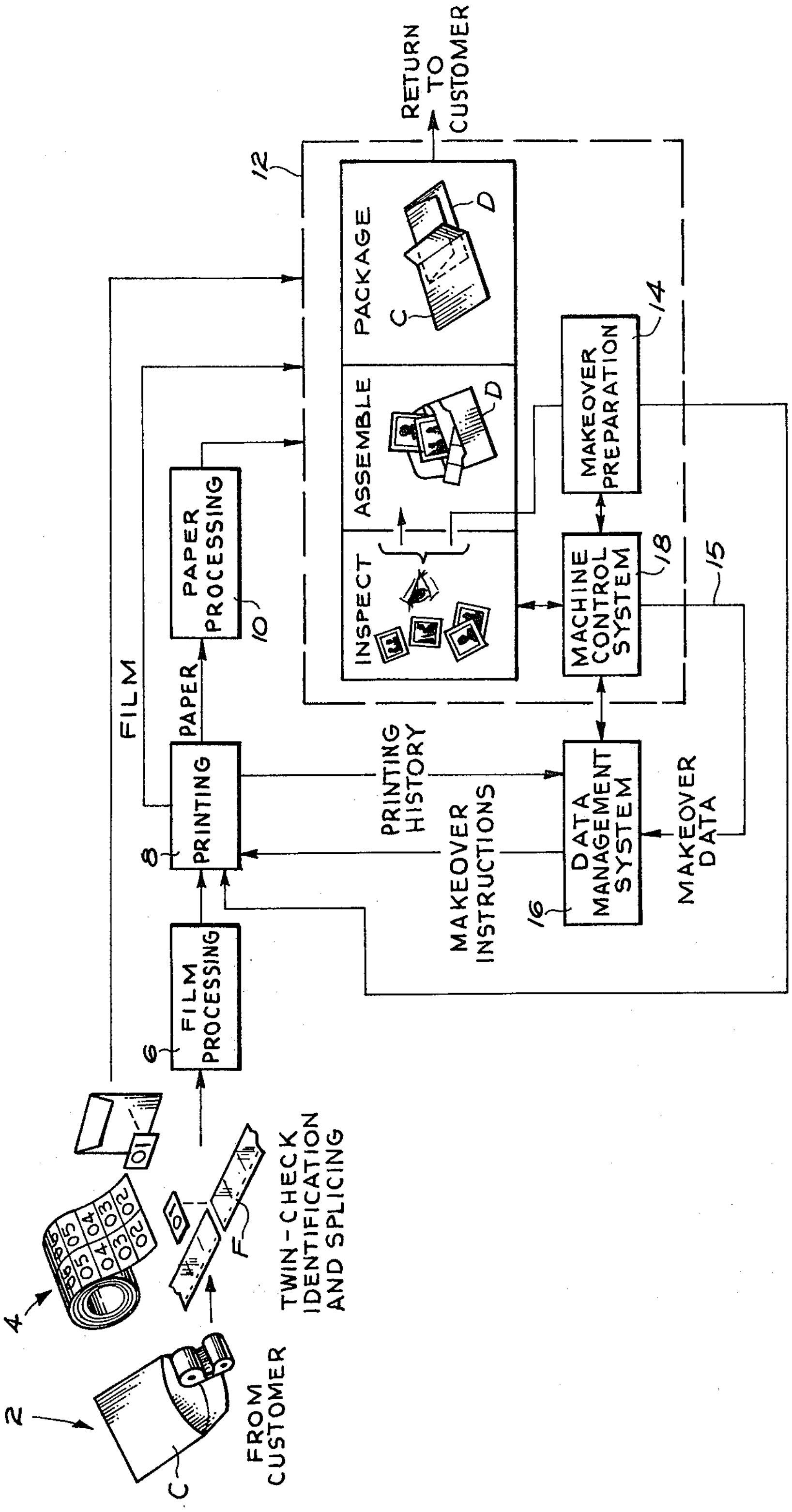
FIG. 1 is a schematic diagram illustrating product flow through a photofinishing operation incorporating the invention.

Referring initially to FIG. 1, there is illustrated the general flow of product through a photofinishing operation that incorporates apparatus and method in accordance with the invention. Customer films, generally in roll or cassette form, enter the process flow at a receiving station 2. There the rolls or cassettes are taken from the customer envelope C. The films F are stripped from their cassettes and/or backing paper and spliced end-to-end at a splicing station 4. It is ordinarily necessary to maintain one-to-one identity between each customer envelope C and each filmstrip F. While several methods are available, a twin check identification system is illustrated in FIG. 1. In a twin check system, duplicate numerical tabs are placed on each customer filmstrip F and envelope C. The tab attached to the filmstrip is in the form of an adhesive splice material adapted for fastening adjacent filmstrips F together as well as for numerically identifying each order. The other adhesive tab is applied to the customer envelope C. The numerical information may be placed upon the tabs in conventional machine-readable form, e.g., as a bar code, or one of the many optically-readable type fonts. For use with this invention, it is desirable to have both an eye and machine readable optical character on each tab.

The reel of filmstrip provided at the splicing station 4 is sent to a film processing station 6, where the latent images on the filmstrips F are developed into negative images. From processing, the developed film reel is mounted on a printer at the printing station 8. The images are serially exposed upon a web of photosensitive print material at the printing station 8. The exposed print material is taken from the printer and processed into visible prints—still in web form—at the paper processing station 10. After processing, the reel of prints from the paper processing station 10, the reel of film from the printing station 8 and the corresponding customer envelopes C are reunited at the inspection and packaging station 12.

The inspection and packaging station 12 integrates three operations in one workplace; (1) the prints are cut and visually inspected with reference to a quality standard, (2) passed prints (i.e., prints conforming to the standard) are sorted into an inner envelope D while nonconforming prints (i.e., prints not conforming to the standard) are prepared for replacement, and (3) the envelope D, if all prints are passed, is inserted back into the customer envelope C for return to the customer. As discussed relative to the prior art, the inspection operation generally isolates two categories of problems: correctible problems and unprintable defects. With the disclosed embodiment of the invention the photofinisher will cull unprintable defects from each order and discard prints bearing these defects. Orders having correctible problems are segregated along with their respective negative filmstrips, at a make-over preparation station 14. These make-over orders are recycled in the product flow for print make-over at the printing station 8. The term 'make-over' will be used throughout to describe a print that has been separated at inspection for subsequent correction. The term 'rejected print' is reserved for those prints having such defects that cause them to be unprintable. A rejected print is simply discarded from the customer order and does not further impede the immediate shipment of the remainder of the order back to the customer (unless the order includes other prints selected for making over).

The overall coordination of data flow between the printing station 8 and the inspection and packaging station 12 is controlled by a data management system 16. The localized control of the inspection and packaging station is performed by a machine control system 18 forming a part of each inspection and packaging machine. Turning back now to when the reel of film was initially printed upon the roll of print material, a series of data records were generated representative of printing conditions for each negative, i.e., a printing history. Such history is temporarily stored by the data management system 16 and issued to the machine control system 18 as required. Exemplary printing history includes film and paper roll identification; customer code (i.e., the numerical character on the splice); the action taken on each negative (print or skip); red, green and blue printing times or circuit voltages, etc.

When rolls of paper and corresponding negatives are mounted on the inspection and packaging machine, the operator enters the roll identifiers into a keyboard attached to the machine control system 18. This entry causes the machine control system 18 to call out the printing history for the rolls from the data management system 16. By then starting the rolls in synchronism with the data, the machine control system 18 is able to match each print with corresponding history data and correlate the respective negative with each print. When the inspector spots a nonconforming print, data regarding its negative may be directly dropped out of the stream of printing history. Such isolation of data serves to identify the affected negative and sets up a make-over record in the machine control system 18. Then the inspector adds appropriate negative corrections to the record. When each customer order is finished, the make-over record is shipped via data line 15 back to the data management system 16. Later, the negatives corresponding to these prints are sent back to the printing station 8 for making over. The make-over data is called up from the data management system 16 and automatically operates the color printer. Then these made-over prints proceed again through the process until they are ready to be inserted back in the customer order.

The operating aspects of the data management system 16 and the machine control system 18 can vary in function. For example, while batches of make-over records are sent over the data line 15 in this illustration, it is apparent that data file maintenance could be solely a function of the data management system 16. In that case, make-over records would be composed in the data management system itself and updated on a real time basis from entries at the inspection and packaging station 12. Furthermore, the printing history might not be 'called out' but directly addressed from the machine control system 18.

Figure 2:
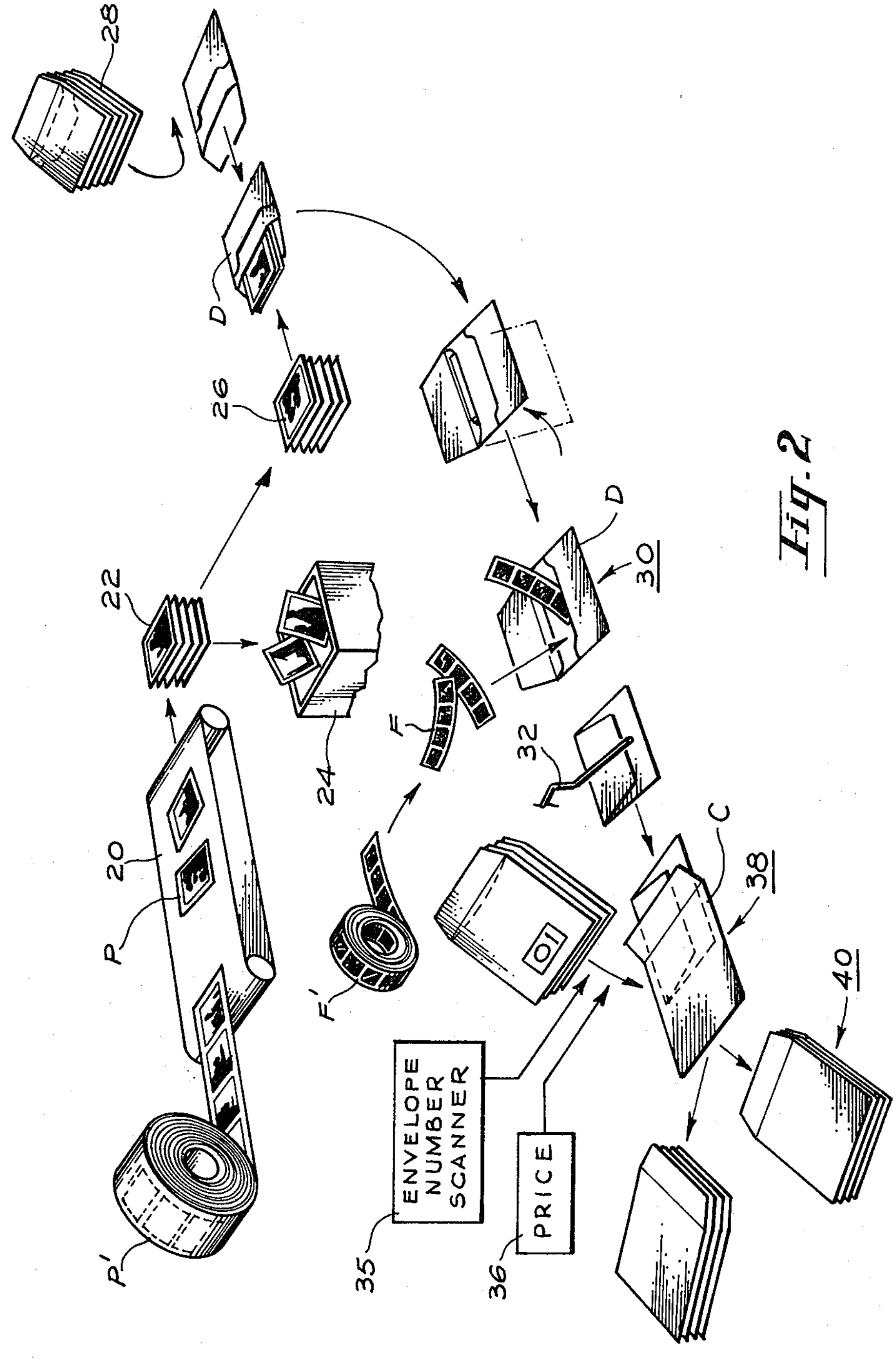
FIG. 2 is a detail of product flow, specifically through inspection and packaging apparatus in accordance with the invention.

Turning now to FIG. 2, the specific product flow through the inspection and packaging station 12 is shown in schematic form. A roll of paper P' is unwound and chopped into a series of prints P. As will be discussed in detail, the prints P are individually inspected as they traverse a moving belt 20. The prints P corresponding to a customer order are congregated into a stack 22 at the end of the belt 20. Reject prints having unprintable defects are noted by the inspector and automatically rejected from the product flow into a waste bin 24. (The handling of correctible prints will be treated beginning in connection with FIG. 3). The stack 22 of prints P are translated to a loading position 26 where they are pushed into an envelope D which has been separated from a pile 28 of such envelopes.

The filled envelope D is then brought through a 90° turn in preparation for insertion of the corresponding negative filmstrips at a second loading position 30. Here the roll F' of filmstrips F are severed into lengths and dispensed to the inspector. While automatic loading may be desirable under certain conditions, having the inspector place the filmstrips F into the envelope D alleviates the problem of handling unpredictable film curl and strip lengths and coincidentally assures continuing attention to the process. The flap of the envelope D is then closed by closing wire 32. Meanwhile, the correct customer envelope C is dispensed from a stack 34 of corresponding customer envelopes C past an envelope number scanner 35 and a pricing station 36 to a third loading position 38. The priced envelope C is opened and the closed envelope D is inserted. Then the envelope C is routed to a stack 40 for shipment.

Figure 3:
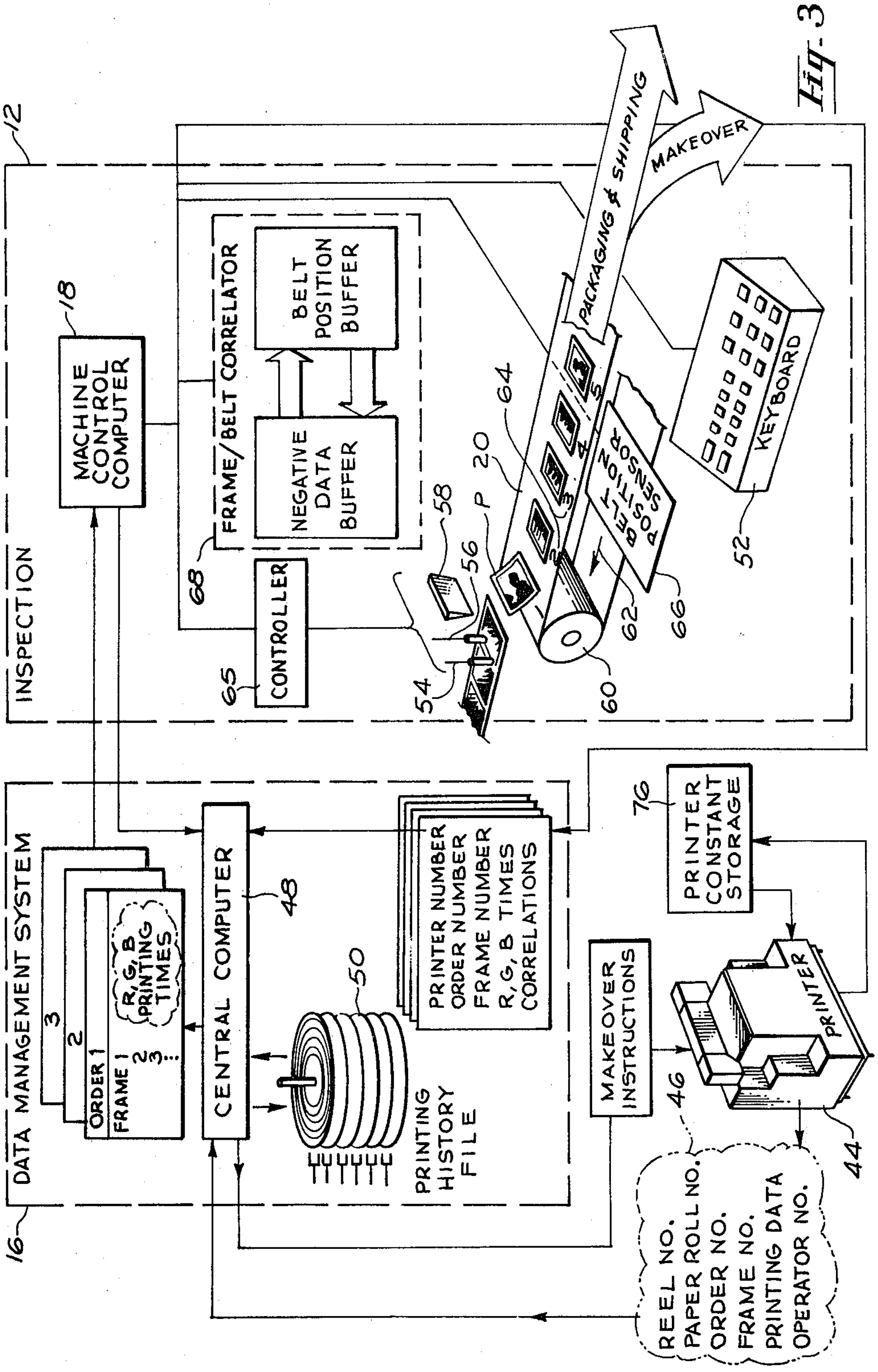
FIG. 3 is a schematic diagram illustrating how data generated at a color printer is integrated into the inspection and make-over operations.

Referring to FIG. 3, printing data concerning negatives in a customer order originate at a printer 44. While representative data is shown within the dotted line 46, any appropriate data can be transmitted at this time. For example, it has been found convenient to block the data in header and trailer format. A typical header would be formed at the beginning of each printer work order (i.e., a new reel of negatives):

(1) printer number
(2) film reel number
(3) beginning splice number
(4) paper roll number
(5) printer operator number In explanation, "printer number" is recorded since each printing machine has its own identity and, importantly, its own printing peculiarities. Therefore, as will be explained later, it is necessary to know which printer has supplied the data for each negative. The "film reel" and "paper roll" have unique numbers identifying each unit as a whole. The "beginning splice number"—attached at the splicing station 4 described in FIG. 1—is also recorded for subsequent use in identifying order numbers. Each printer operator has an identifying "printer operator number"; this can be used, e.g., to relate training needs and quality output. In addition, as is usual in a data base environment, certain internal housekeeping signals will be passed with the header for use by the operating system of the computer. Since several paper rolls may be produced from one film reel, a new header is transmitted for each new paper roll.

The header is processed by a central computer 48, which manages all of the data transactions. When data comprising the header is received, the central computer 48 sets up space on a magnetic disk file 50 sufficient to contain the header and all subsequent records for that film reel. This storage space first receives the header information. Meanwhile, the printer 44 has begun to proceed serially through orders of customer negatives. At the beginning of each customer order a sub-header is produced containing relevant data generally applicable to that order:

(1) order number
(2) film type
(3) paper type
(4) lens type
(5) order type
(6) prints per negative "Order number" is calculated from the beginning splice number of the film reel (which is the first customer "order number"). Each "order number" thereafter is incremented by one to correspond with the splice number of that order. Since the splice numbers applied at the splicing station 4 (FIG. 1) are in numerical sequence, it is unnecessary to examine splices after the first one. "Film type" identifies the type of film from those normally processed. The "paper type" may be silk or glossy. Borderless or bordered prints are signified by the "lens type." Process and print orders are distinguished from reprinting of previously processed negatives by the "order type." If multiple sets of prints are desired, that indication is entered in the "prints per negative." Data in the header and sub-header are initially entered into the data flow by the printer operator through a keyboard or similar device. Portions of the data, e.g., beginning splice number, is in machine and eye readable form and could be entered either by keyboard or by an appropriate sensor. After initial entry, subsequent sub-headers for a given film reel are obtained from information in the previous sub-header—unless a change is put in by the operator—with the "order number" being incremented by one count.

As each negative is printed, a negative trailer record is generated including information peculiar to that negative:

(1) red printing data
(2) green printing data
(3) blue printing data

The red, green, blue printing data may include the elapsed times for which each respective color is allowed to impinge the printing paper. More conveniently, the data may be the actual circuit voltages used to determine the timing of the cutoff filters of the printer. In any event, this data is uniquely responsive to a pre-examination of the negative and therefore is the printer's determination as to how to print an acceptable negative. The printer 44 determines exposure conditions for each negative; however, if the exposure conditions are beyond certain thresholds indicative of an 'unprintable' negative, the filmstrip will be incremented without printing that negative.

In the present apparatus, a trailer record is provided whether or not a negative is printed. A sequence of zeros is entered to indicate that no print was made for a given negative because of 'unprintable' conditions. Then, in subsequent processing the order of trailer records is tracked to determine the position of a negative in a customer order. In tracking the data, a negative frame counter is set for each customer order and incremented with the input of each trailer record. In this manner, the relative position of each frame in each order is known during processing. Alternatively, a separate data field may be provided for the negative number. This field would be filled by treating the first negative as frame 1 and then incrementing the number for each subsequent negative. The trailer for an unprinted frame could be skipped while the negative number could be incremented to account for this frame.

The space set aside on the printing history disk file 50 is sufficient to accommodate all the headers, sub-headers and trailers for a given film reel. Unique identification for each header block (and its following sub-headers and trailers) is maintained by the combination of digits indicative of printer number, film reel number, beginning splice number and paper roll number. When a paper roll and film reel are mounted at the inspection station 12, their respective numbers are noted by the operator on the accompanying scheduling tickets and entered into a keyboard 52. The printer number and beginning splice number are entered in similar fashion. These four data fields comprise the unique identifier that is transmitted via machine control computer 18 back to the central computer 48. The computer 48 then searches the disk file 50 for a data block matching this identifier. When found, the data is made available to the machine control computer 18.

The film reel F′ and the paper roll P′ are synchronized with the first trailer in the data block by orienting the beginning of the reel F′ and the roll P′ with respect to the batch of data for the corresponding customer order. For this purpose the paper roll P′ is advanced until an order sort sensor 54 sees the first order mark (an order sort mark is placed at the beginning of and between each subsequent order). The film reel F′ is advanced until the first film splice is sensed (or manually observed by the inspector). The data is brought to a point of readiness by instructions in a computer program. Then the inspector strikes a 'start' button on the keyboard 52 and the operation begins. The position of each cut is controlled by the machine control computer 18 (via a controller 65) pursuant to signals from a cut mark sensor 56 (such cut marks are placed between each print). However, the cut is made by a knife 58 when the inspection belt 20 reaches the next predetermined position, i.e., the timing of each cut is a function of the instantaneous position of the belt 20. The belt 20 is wrapped around a pair of transport rolls 60 (only one of which is shown in FIG. 3) and moves in a direction depicted by the arrow 62 such that the belt surface carries away cut prints from the knife 58.

A number of positions 64 are defined on the belt 20 (e.g., belt positions 1, 2, 3, 4, 5 . . . in FIG. 3). Each position includes a reference mark, which will be described in detail later. These reference marks are detected by a belt position sensor 66 as the belt 20 traverses between the transport rolls 60. The signals provided by the belt position sensor 66 are interpreted by the machine control computer 18 into a specific belt position number, and more specifically, into the belt position number about to receive a cut print P. The initiation of the cut by the knife 58 is also responsive to these signals. Moreover, the computer 18 includes a frame/belt correlator 68 that relates the belt position to particular trailer data to identify the negative frame corresponding to the print located at each belt position.

The negative identity thus travels with the moving print as the belt 20 advances. Importantly, with the negative identity being constantly monitored, all of the related information in the data block is available for processing. Therefore, when a particular belt position is selected by reference to the position identifier, the machine control computer 18 is able to locate the corresponding negative relative the consumer filmstrip F and extract the position and printing data for further processing.

Figure 10:
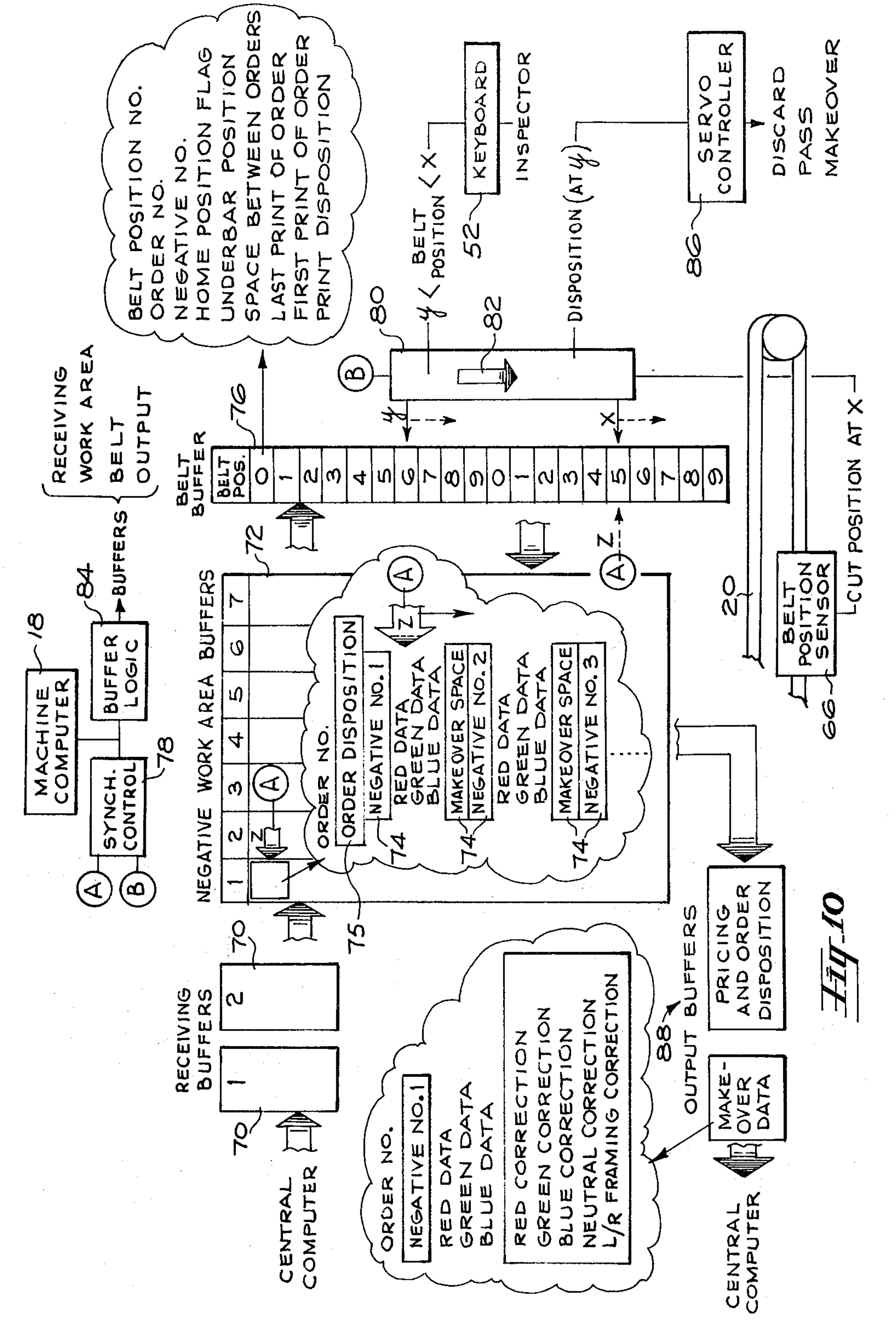
FIG. 10 is a schematic diagram illustrating the correlation of negative-related data to inspected prints.

Referring now to FIG. 10, as the orders are unreeled from the paper roll, data is transmitted via data link on an order-by-order basis from the central computer 48 to a pair of receiving buffers 70-1 and 70-2 in the machine control computer 18. The buffers 70 provide incoming storage for new order data; a full customer order is stored in one buffer 70. There are two buffers 70 to provide a capability to look ahead for new data while handling a present order. Ordinarily the order data is alternately received by each of the buffers 70. The data is then transferred to one of a group of seven negative work area buffers 72-1 to 72-7, depending on which work area is not busy at the moment of transfer. These buffers 72 are used as work areas for handling data while the corresponding prints are processed through the inspection and packaging machine.

Each buffer 72 provides sufficient space to store the order sub-header data as well as all negative trailer data for a given customer order. In addition, space (indicated by reference character 74 in FIG. 10) is allocated following each trailer for the following additional information concerning the sequence and disposition of prints and make-over instructions, should there be any:

(1) negative position number
(2) "makeover space", i.e.,
(a) framing correction
(b) neutral correction
(c) red correction
(d) green correction
(e) blue correction As the new data is being written into a buffer, e.g., buffer 72-1, a number is written in the "negative position number" space representative of the sequential position of each negative in the customer order. If all prints are either passed or if those failing to pass are rejected as 'unprintable', then the space allocated for makeover is not used further. However, if the inspector sees a nonconforming print which is correctible then the neutral, red, green and blue corrections are written in the make-over record via keyboard 52. If the negative was incorrectly framed, i.e., a dark frame bar shows up on one side of the print, the inspector may enter a framing adjustment into "framing correction." The effect of this adjustment is to cause the printer to automatically step one or more increments to the right or left, depending upon the data entry via keyboard. Furthermore, as shown in FIG. 10, space 75 is allocated in each buffer 72 for "order disposition." Initially blank, the "order disposition" 75 is accordingly completed to indicate a passed order, an order that must be set aside for custom treatment, or an order containing make-overs.

Trailer data corresponding to negatives skipped by the printer (being determined 'unprintable' by the automatic printer) is included in the buffer 72 at the appropriate position in the customer data. However a string of zeros will have been entered into the fields for red, green and blue data. As with printed negatives, the space allocated for "negative position number" is filled with the correct sequential position of the unprinted negative relative to negatives in the customer filmstrip. Therefore the sequence of data in the buffer 72 accounts for all negatives, whether printed or not. This is later important for identifying the correct negative in an order having previous negatives skipped by the printer.

Thus expanded to accept make-over and disposition data, the negative work area buffers 72 need to be related to the prints actually being inspected on the print belt 20. This correlation is provided by a group of movable data pointers x, y and z and a belt buffer 76. Looking first at the belt buffer 76, space is therein allocated for the following data relative to each belt position:

(1) belt position number
(2) order number
(3) negative number
(4) home position flag
(5) underbar position
(6) space between orders
(7) last print of order
(8) first print of order
(9) print disposition The twenty belt positions are numbered 0–9 in two series. One belt position is considered the initial or "home position"; therefore all other positions can be determined relative to the home position. Specifically, one series of positions 0–9 are referred to as "underbar" relative the home position. Each belt position area of the belt buffer 76 permanently contains the "belt position number" (0–9), the "home position flag" (on one position only), the "underbar position" (on one series 0–9 only). The remaining data is completed after the print lying in the position is identified by the logic. In the preferred embodiment, a physical space is left between orders on the belt 20; this event is identified by an entry in "space between orders." The disposition of the print (i.e., a print for custom treatment, a passed print, a discard or a makeover) is noted in "print disposition."

The pointers x, y and z synchronize the reading of negative data in the buffer 72 with movement of the belt 20. The pointers are initialized such that the pointer z points to the current block of negative data for the print being cut and dropped upon the print belt 20, pointer x points to the belt position about to receive the cut print and pointer y points to the belt position about to transfer its print to the stack 22—or waste bin 24—at the end of the belt 20 (see FIG. 2). Pointers x and y are moved in unison under command from a synch controller 78 such that the space (x-y) between them always remains equivalent to what the inspector sees as visibly exposed on the print belt 20. Moreover, any message from the keyboard 52 is confined to those belt position numbers presently in the space (x-y) between the pointers x and y. It is seen, therefore, that the belt positions, do not repeat themselves in the space (x-y); the inspector thus has to deal with but one digit identification. The pointers x and y are illustrated in FIG. 10 as emanating from a pointer controller 80 that is adapted for movement in the direction of the arrow 82. Furthermore, the pointer controller 80 is disposed to fold back and recirculate through the buffer 76 as the belt 20 advances, always maintaining the space (x-y) between the pointers (i.e., the pointer x will reposition to the top of the buffer 76 as the pointer y progresses toward the bottom of the buffer 76, and the pointer y will also reposition to the top as the pointer x progresses down the buffer 76, and so on).

The correlation is effected when the pointer z points to a specific block of negative data in the buffer 72, thereby relating that data block to the belt at the cut position (as shown illustratively in broken arrow adjacent the belt buffer 76). Under control of buffer logic unit 84, the negative number and order number are transferred from the appropriate buffer 72 to corresponding allocated space in the belt buffer position opposite the pointer x. If the print is first or last in the order, that fact is noted in the appropriate space allocated in the belt buffer position. When the print is cut, the pointers advance and the process is repeated. In orders having negatives skipped by the printer, the corresponding presence of zeros in the trailer data is sensed by means of the pointer z. The logic unit 84 interrogates each negative block for zeros and, if found, increments the pointer to the next negative data block not having zeros. Therefore the belt buffer 76 is always receiving the next negative number corresponding to the next actual print on the roll of prints P'. At the same time, the negative number field in the belt buffer 76 reflects the sometimes broken sequence of actual printing order.

While illustrated as acting in unison with the pointer x, the pointer z may be designed to operate ahead of the pointer x and enter corresponding negative data into belt buffer positions representing belt positions that have yet to receive a cut print. However, regardless of their specific formulation, the pointers illustrated in FIG. 10 represent conventional programming techniques within the capability of the ordinarily skilled computer programmer. With this in mind, the ordinary programming involved in the synch control 78 and the buffer logic 84 will not be set forth in detail.

At this time the print is visible to the inspector. When a nonconforming print is noted, the inspector enters the belt position via the keyboard 52. The logic unit 84, using ordinary programming techniques, searches the space (x-y) between pointers to find the position. Once it is found, the order number and negative number are extracted and used by the unit 84 to locate the particular negative work area buffer 72, and the particular negative therein, where the corresponding negative information is located.

Once the correct buffer is located, corrections are entered from the keyboard 52 into the makeover space 74 in the appropriate work area buffer 72. A disposition of makeover is then entered into the belt buffer data corresponding to the related belt position. Similarly, if a discard (or custom) entry is made from the keyboard 52, a discard (or custom) disposition is noted in the belt buffer 76. No entry signifies a passed print. Where makeover is entered via keyboard 52, but no corrections have been entered by the time the pointer y reaches the affected belt position, the inspection belt 20 is stopped by a servo 86. When corrections are entered, the inspector can restart the machine.

The pointer y corresponds to the exit point of the print from the belt 20. The contents of the "print disposition" space for the given belt position instruct the servo controller 86 as to what to do with the newly released print, i.e., principally whether to let the print through or discard it. The presence of a make-over or custom print in the order is therefore noted by entry into the "order disposition" space 75 in the appropriate work area buffer 72. When the order reaches the packaging end of the machine, the "order disposition" will be queried to determine if the order should be segregated as a make-over or custom order, or passed through to shipping.

Once the make-over data is entered by the inspector for every print in the order requiring makeover, the subset of the original order data is collected in output buffers 88 and from there transmitted by data link to the central computer 48, where space has been allocated on the disk file 50 for make-over records from the presently running film reel. This subset of data consists of the reel header, the order sub-header and the print trailer—including make-over data—for each print being done over, as indicated below:

Header:
(1) printer number
(2) film reel number
(3) beginning splice number
(4) paper roll number
(5) printer operator number
(6) I & P station number
(7) I & P operator number Sub-header:
(1) order number
(2) film type
(3) paper type
(4) lens type
(5) order type
(6) prints per negative Trailer:
(1) red printing data
(2) green printing data
(3) blue printing data
(4) negative position number
(5) framing correction
(6) neutral correction
(7) red correction
(8) green correction
(9) blue correction In practice, space is allocated for make-over data on the disk file 50 as soon as the film reel and paper roll are set up for inspection. At that time the header is transferred to the make-over space. Note that space is now allocated for "inspection and packaging station number" and "inspection and packaging operator number". These identifications are keyed in by hand from the keyboard 52 at the inspection workplace. Then after each order is inspected, the sub-header and trailers (of only those prints being redone) are transmitted back to the central computer 48 and stored in sequence in the appropriate film reel space in the disk file 50.

Meanwhile, as will be shown in detail later, the passed prints are packaged and prepared for shipping. Data necessary for pricing (e.g., number of prints chopped less discards) is collected in the output buffer 88 (FIG. 10) for subsequently driving the price applicator. Orders having prints directed for makeover are separated out of the product stream and held until the nonconforming prints are replaced with new, corrected prints. For this to happen, the negatives must be recycled to a printer. Therefore, as will be shown in detail, the negative strip F containing the negative(s) for make-over print(s) is also shunted out of the product stream, cut off of the film reel, and spliced upon a make-over reel comprising a series of such filmstrips spliced end-to-end. Importantly, the sequence of customer orders on the make-over reel matches the sequence of make-over data contained on the disk file 50.

When sufficient make-over product has collected, a printer—such as printer 44—is scheduled to print the negatives again. The make-over reel is loaded upon the printer and the printer calls for the first make-over order. Since the 'negative position number' has now been filled in, the printer skips to the make-over negative (not printing intervening negatives) and applies the red, green and blue corrections for exposure determination. A new print is exposed with the required corrections. The foregoing procedure works most consistently when the negatives are returned to the same printer on which the original prints were exposed. The reason for this reflects the printing peculiarities of each printer. No two printers will have their exposure determination circuits set up to act exactly the same, i.e., signal voltages representative of the same negative may differ from printer to printer. Moreover, it is an onerous requirement to match all the printer circuits. However, it is possible to measure these differences and store these values in a printer constant storage 76 (FIG. 3). Then, depending on which printer receives the make-over negatives, the proper printer constants can be retrieved from the storage 76 and used to appropriately modify the exposure time. Recalling that the make-over record has the original printer number and the original printing times, it is seen that all necessary data is present to make the calculations.

The make-over negatives and the make-over print roll are sent (after paper processing) to a separate make-over inspection and packaging workplace where they are reunited with the previously set aside customer order. There the make-over prints are cut and placed in the customer order for the nonconforming prints; the filmstrips are cut into suitable size strips (usually three to five negatives) and inserted into the customer envelope. Then the orders proceed as usual to shipping.

While the foregoing discussion has described one printer 44 and one inspection and packaging station 12, no such limitation is intended. The data management system 16 is disposed to cooperate with a group of printers—such as printer 44—and a group of inspection and packaging stations—such as station 12. The central computer 48 allocates space on the disk file 50 sufficient to receive data from each of the printers. Then, as each order is printed on a printer, the computer 48 routes that data to the appropriate space on the disk file 50 for the respective printer. Thus the stream of data entering the computer 48 will include records from many different orders being printed on many different printers. Similarly, printing history data is being delivered—an order at a time—to a plurality of inspection and packaging stations 12. The output stream of data will therefore include records devoted to several stations 12 in simultaneous operation. It is contemplated that, as far as the data management system 16 is concerned, printing is independent of inspection and packaging, i.e., input records from many operating printers will be received simultaneously with the delivery of output records to many inspection and packaging stations.

Figure 4:
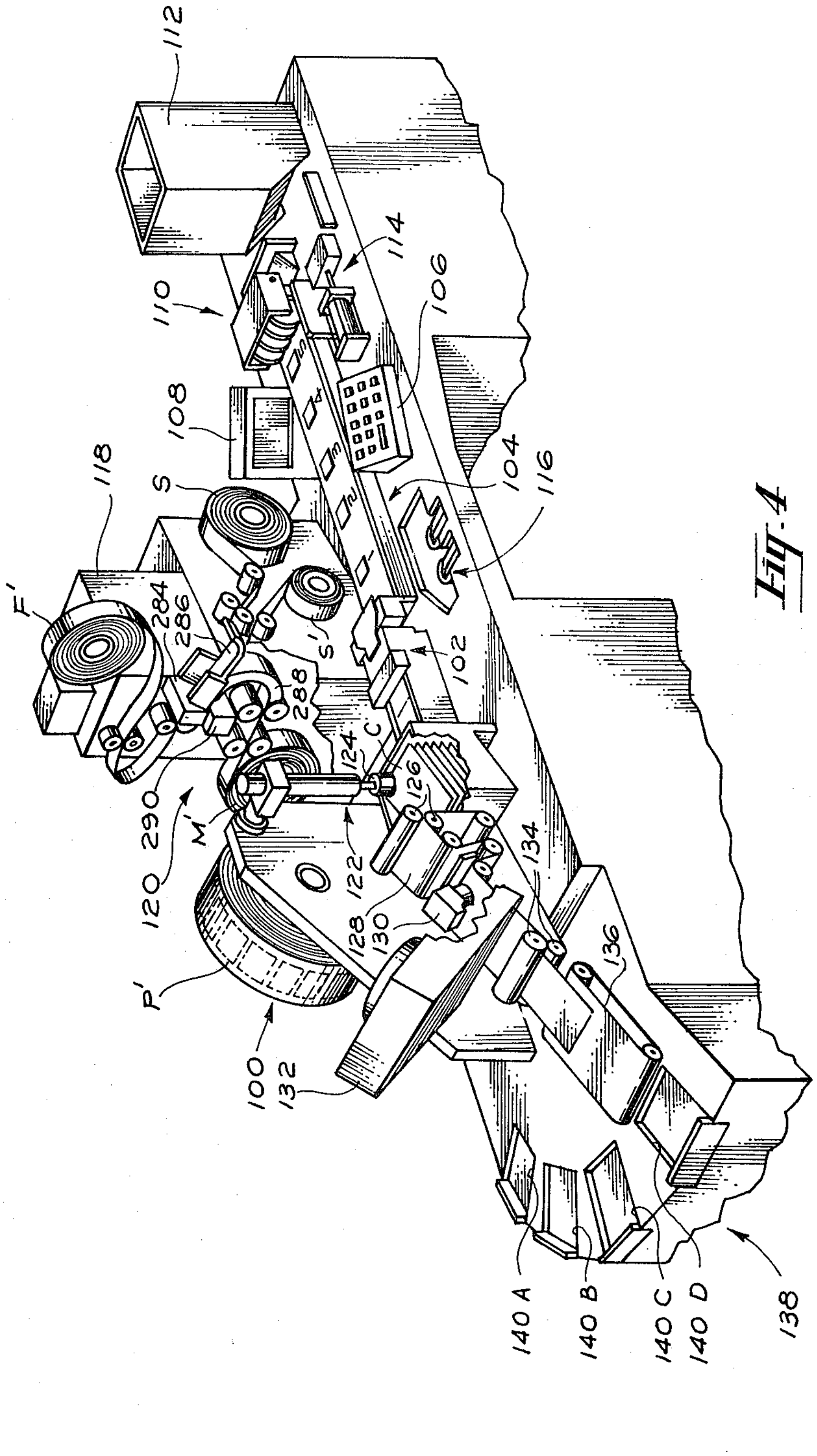
FIG. 4 is a perspective view of inspection and packaging apparatus in accordance with the invention.

Turning now to FIG. 4, a perspective overview of the inspection and packaging machine is shown. The parts will first be described generally and then taken up in more detail in the accompanying figures. The developed paper roll P′, including the uncut prints P, is placed upon the machine at a paper supply and feed section 100. The paper web is unreeled to a cutter assembly 102 where the prints are cut. Then the cut prints P are positioned upon an inspection conveyor and print position detector 104. Corrections and rejections are entered through a keyboard assembly 106 and visually verified on a display assembly 108. The prints are either passed, rejected or noted for correction. Rejected and nonconforming prints are diverted to waste while passed prints are carried to a stacker assembly 110. The stacked prints are moved as a group toward the front of the machine (as shown in FIG. 2). A double-pocket envelope (hereafter referred to as DPE) is removed from the bottom of a stack of such envelopes by a DPE shucker, turnaround and shuttle assembly 112 and positioned for receiving a stack of prints. Then the stacked prints (which have moved adjacent the assembly 112) are inserted into one of the pockets of the waiting DPE by a DPE stuffer assembly 114. The DPE is then uprighted in a rotate and pivot assembly (best shown in FIGS. 8A to 8G, since the assembly is beneath the machine table surface) and conveyed to a DPE opener assembly 116. Here the DPE is held open so as to receive the corresponding customer negative filmstrips F in the other of its pockets. These strips F are dispensed by a film cutter 118 to the operator. If the DPE requires make-over prints, the strip F is not cut but is diverted into a resplicer assembly 120 where it is spliced to a make-over film reel.

The customer envelope C is withdrawn from a stack of such envelopes by an envelope picker assembly 122 having a pneumatically operated suction foot 124 that reaches down and engages the top envelope C. This envelope is raised to the nip of a pair of pinch rolls 126, through which it is pulled upon an envelope belt conveyor 128. The envelope proceeds past an optical scanner assembly 130 which compares and verifies the customer identity (on the splice) of the envelope C with the data in the computer 18 (FIG. 3). The envelope then proceeds past a conventional price label applicator 132 (shown partially in broken away form) where the appropriate price is printed on a label and applied to the envelope C. The envelope proceeds down the belt conveyor 128, passing between the nip of a pair of pinch rollers 134 until the flap of the envelope C is caught by the rollers 134 and the envelope C is positioned in a ready position for receiving the DPE. The DPE, meanwhile, is advanced from the DPE opener assembly 116, has its flap closed, and is thrust into the waiting customer envelope C. Then the envelope C is released and travels along a pivotable belt conveyor 136 to a customer envelope sorter assembly 138. There the envelope C is dropped into one of the bins 140A to 140D, depending upon the disposition of the order, e.g., custom orders to bins 140A, makeovers to bin 140B and passed orders to bins 140D and C.

Figure 5:
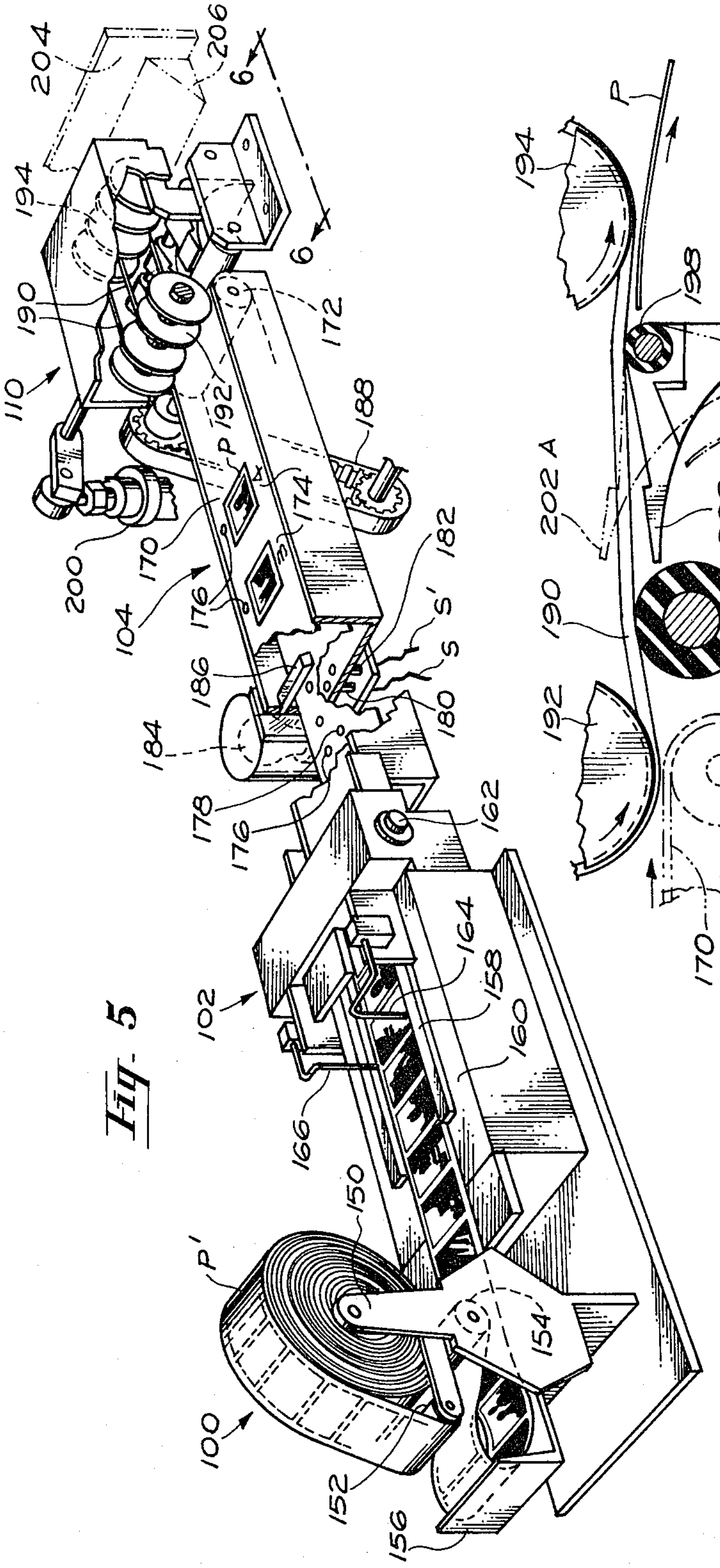
FIG. 5 is a detailed perspective view of the print chopping, inspection and stacking portions of the inspection and packaging apparatus.

Turning next to FIG. 5, the paper supply and feed section 100, the cutter assembly 102, the inspection conveyor and print position detector 104 and portions of the print reject and stacker assembly 110 are together shown in greater detail. The paper supply and feed section 100 includes a support 150 having a spindle for supporting the roll P′ of developed prints P. The unreeled web of paper is disposed around tension rollers 152 and a driven roller 154. The paper web further proceeds against a backstop 156 where the web reverses motion and is directed along a paper track 158 on a cutting table 160. A rotary cutting knife 162 is mounted for rotation within the cutter assembly 102. Also within the cutter assembly 102 is a conventional intermittent drive unit (not shown). Adjacent both sides of the paper web entering the cutter assembly 102 are an end-of-order detector 164 and a paper chop detector 166. Each detector is positioned adjacent the edge of the paper web to detect marks indicating the division between customer orders and between individual prints P within an order, respectively. The paper is pulled along the track 158 by the drive unit within the cutter assembly 102. As the web moves, it is dragged away from the backstop 156 until sufficient tension builds between the doubled-back paper web and the drive roller 154 to cause the roller 154 to pull an additional length of paper web off the reel P'.

The position of each cut is controlled by signals generated by the order and chop sensors 164 and 166. However the time of occurrence of each cut is controlled by the position of a print belt 170 in the inspection conveyor and print position detector section 104. Formed in an endless loop, the belt 170 is wrapped at either end about a turnaround roll, one of which is shown as a drive roll 172 in FIG. 5 (the other roll is obstructed by the cutter assembly 102 but is analogously shown as the free-running roller 60 in FIG. 3). The belt 170 includes a number of positions for receiving the prints P, each position having an identifier 174 marked on the belt 170 adjacent one edge of a print P that occupies the position (e.g., . . . 3, 4 . . . on the belt 170).

The belt 170 also includes a plurality of apertures 176, each located relative to one of the position identifiers 174. Furthermore, a belt reference aperture 178 is located adjacent one of the belt positions. The reference aperture 178 marks the home position mentioned in connection with the belt buffer 76 of FIG. 10. All the other belt positions are numbered with reference to the home position in two sequences 0–9. A pair of photosensors 180 and 182 are located adjacent the position apertures 176 and the reference aperture 178, respectively. Light from a source 184 continuously impinges the underside of the belt 170 via a light bar and deflector 186 such that light strikes the photosensors 180 and 182 whenever the respective apertures 176 or 178 pass between the sensors and the light bar 186. Signals S and S' are taken from the sensors 180 and 182, respectively, representative of the passing of the apertures 176 and 178. Each passage of an aperture 176, and the signal S generated therefrom, represents one of the sequence 0–9 of belt positions; the relative position of the belt with respect to the home position of aperture 178 determines which of the two sequences 0–9 are being observed by the inspector (i.e., whether the position is "underbar" or not, referring to FIG. 10). These signals are delivered to the machine control computer 18 (FIG. 3) for determining the timing of the print cut and for tracking the identity of the moving prints. For example, once the sensors 164 and 166 have signalled that the print P is in position for a cut, the timing of the cut is determined by the coincidence of a belt position and identifier 174 with the output of the cutter assembly 102. This coincidence is determined by the processing of the signals S and S'.

Figure 6:
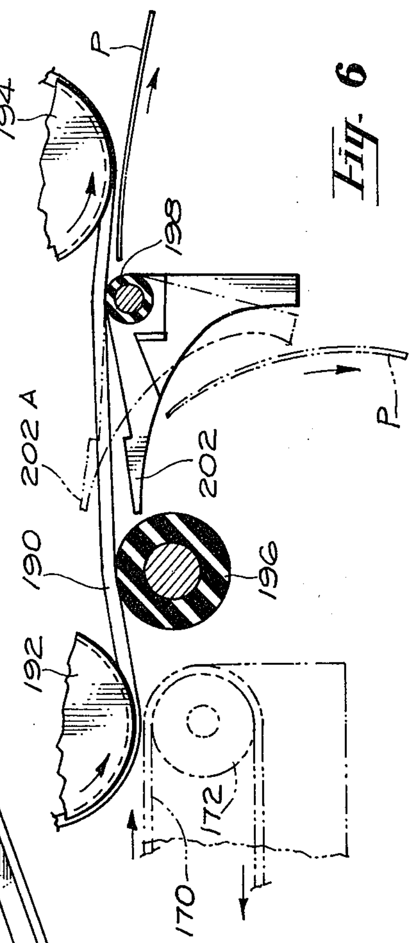
FIG. 6 is a cross-section of the reject mechanism, taken along lines 6—6 in FIG. 5.

The belt 170 is driven from a conventional power drive source (not shown) connected by a chain and sprocket 188 to the drive roll 172. Rejected and nonconforming prints, indicated by the inspector via the keyboard 106 (FIG. 4), are separated from passed prints at the print reject assembly 110. Prints leave the conveyor 170 and either pass to a stacking position or a reject bin. Removal of the prints is facilitated by an o-ring and pinch roller combination best shown in partial cross section in FIG. 6. Several o-rings 190 (two as shown in FIG. 5) are mounted for movement between complementary, spaced-apart pairs of grooved rollers 192 and 194. Opposite the rollers 192 and 194, and adjacent the o-rings 190, are a pair of pinch rollers 196 and 198. A movable reject flipper 202 is pivoted on the same axis as the pinch roller 198 by a pneumatic drive cylinder 200 (see FIG. 5). The rotary movement of the o-rings 190 is provided by frictional contact between the o-rings 190 and the conveyor belt 170.

Prints exiting the belt 170 are pinched in the nip between the o-rings 190 and the belt 170, supported by the drive roller 172. The prints are then propelled into the nip between the o-rings 190 and the pinch roller 196 and from there, if the prints are passed, into the nip between the o-ring 190 and the pinch roller 198. Passed prints are then delivered one on top of the other against a print-stop plate 204 upon a print support ramp 206 (both shown in phantom in FIG. 5). On the other hand, rejected prints are diverted by the print flipper 202 into a reject bin. The print flipper 202 is formed with adjacent fingers that are adapted to protrude past the o-rings 190 when the cylinder assembly 200 rotates the flipper 202 into a reject position 202A (See FIG. 6). When the machine control computer 18 directs the flipper 202 into the position 202A, a print exiting the nip between the o-ring 190 and the pinch roller 196 is intercepted by the protruding fingers of the flipper 202 and diverted out of the product stream into a reject bin.

Figure 7:
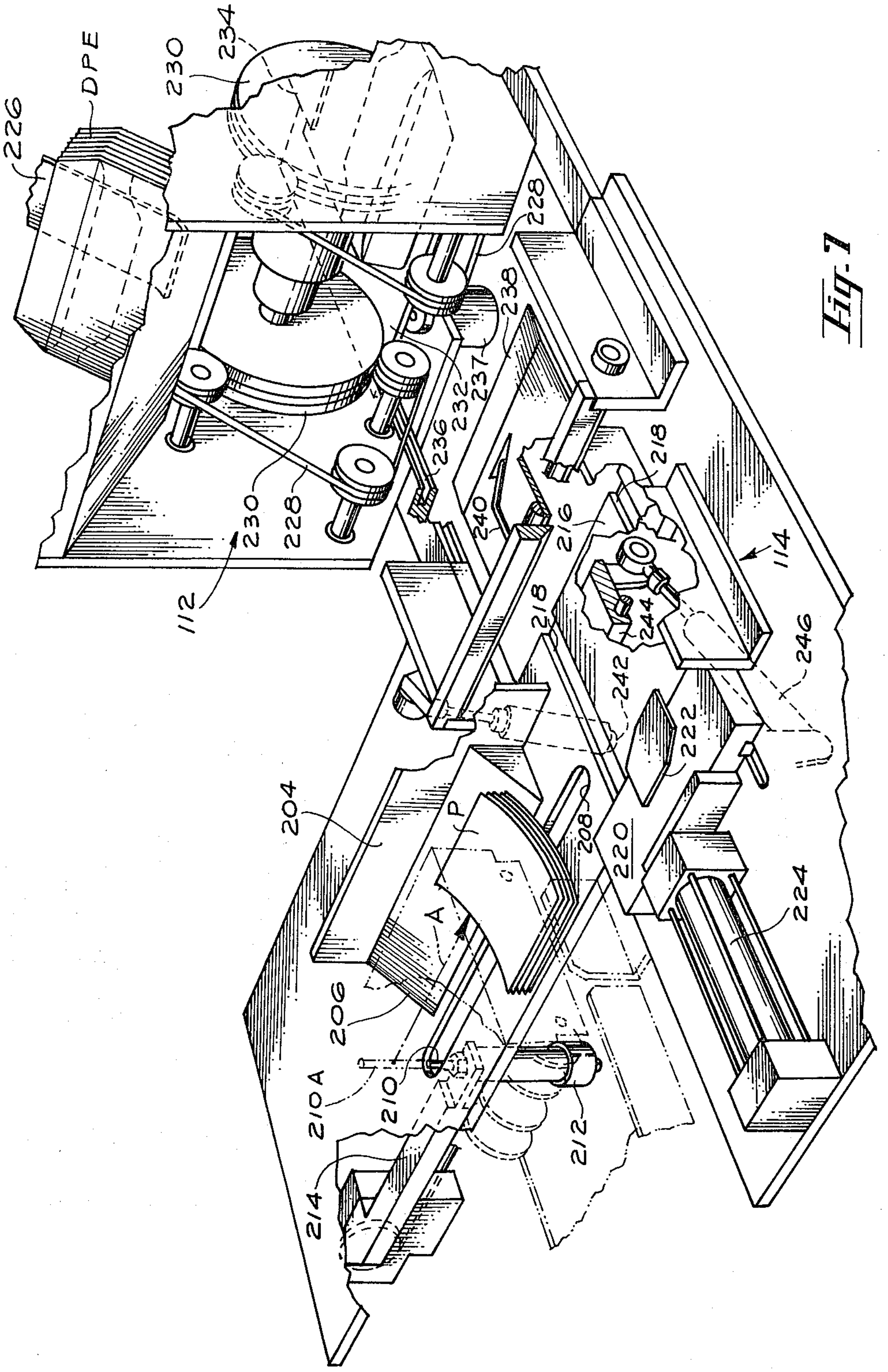
FIG. 7 is a detailed perspective view of the double pocket envelope shucker and print insertion portions of the inspection and packaging apparatus.

Proceeding further to FIG. 7, the prints P are shown stacked upon the print support ramp 206 against the print-stop plate 204. It is noted that the prints P are stacked above a slotted aperture 208 in which the push finger 210 of a double acting cylinder 212 protrudes. The cylinder 212 is mounted on a block 214 that is caused to reciprocate between opposite ends of the slotted aperture 208. Furthermore, the push finger 210 is adapted to extend into an upward position 210A (shown in phantom). In operation, after a customer order of prints has collected adjacent the print ramp 206, the machine control computer 18 actuates the cylinder 212, extending the push finger 210 to position 210A. The block 214 is then actuated to push the cylinder 212 along the slotted aperture 208. The prints are contacted by the upraised finger 210 and pushed in the direction of arrow A until resting on a loading platform 216 in the DPE stuffer assembly 114.

The platform 216 includes a pair of pusher guide rails 218 in which a print pusher block 220 is slidably mounted. A print retaining plate 222 is fastened to overhang the pusher block 220. A stuffer cylinder 224 is attached to the pusher block 220 for advancing the block 222 back and forth in the guide rails 218. Eventually, the prints will be moved inside a DPE by the DPE stuffer assembly 114. A stack of DPE's are stored in the DPE shucker, turnaround and shuttle assembly 112. The DPE's are initially stacked flap-up and inside pockets facing down. This orientation allows a shucker blade 226 to reach inside one of the downward-facing pockets of the bottommost DPE and to force the bottom of the DPE into the nip between a pair of o-rings 228 and DPE turnaround rolls 230. The DPE is carried around the rolls 230 by friction, then dropping off the rolls 230 upon a DPE shuttle plate 232 and up against a retainer 234. The shuttle plate 232 is mounted in a pair of shuttle guides 236 (one of which is shown) for reciprocal movement by a rotary actuator 237.

To facilitate the entry of the prints into the DPE, a DPE opener blade 238 is provided for entering one of the pockets of the DPE and propping the pocket open. An air tube 240 further assists in opening the DPE by forcing a stream of air into the DPE, causing the pocket to billow outward. The opener blade is controlled by an actuator assembly 242 (shown in phantom). The positioning of the DPE preparatory to loading is further controlled by a DPE tab lock plate 244 that engages the DPE, sandwiching the flap between itself and the underside of the platform 216. The lock plate 244 is pivoted in and out of its operative position by an actuator assembly 246 (shown in phantom).

Figures 8A, 8B, 8C, 8D, 8E:
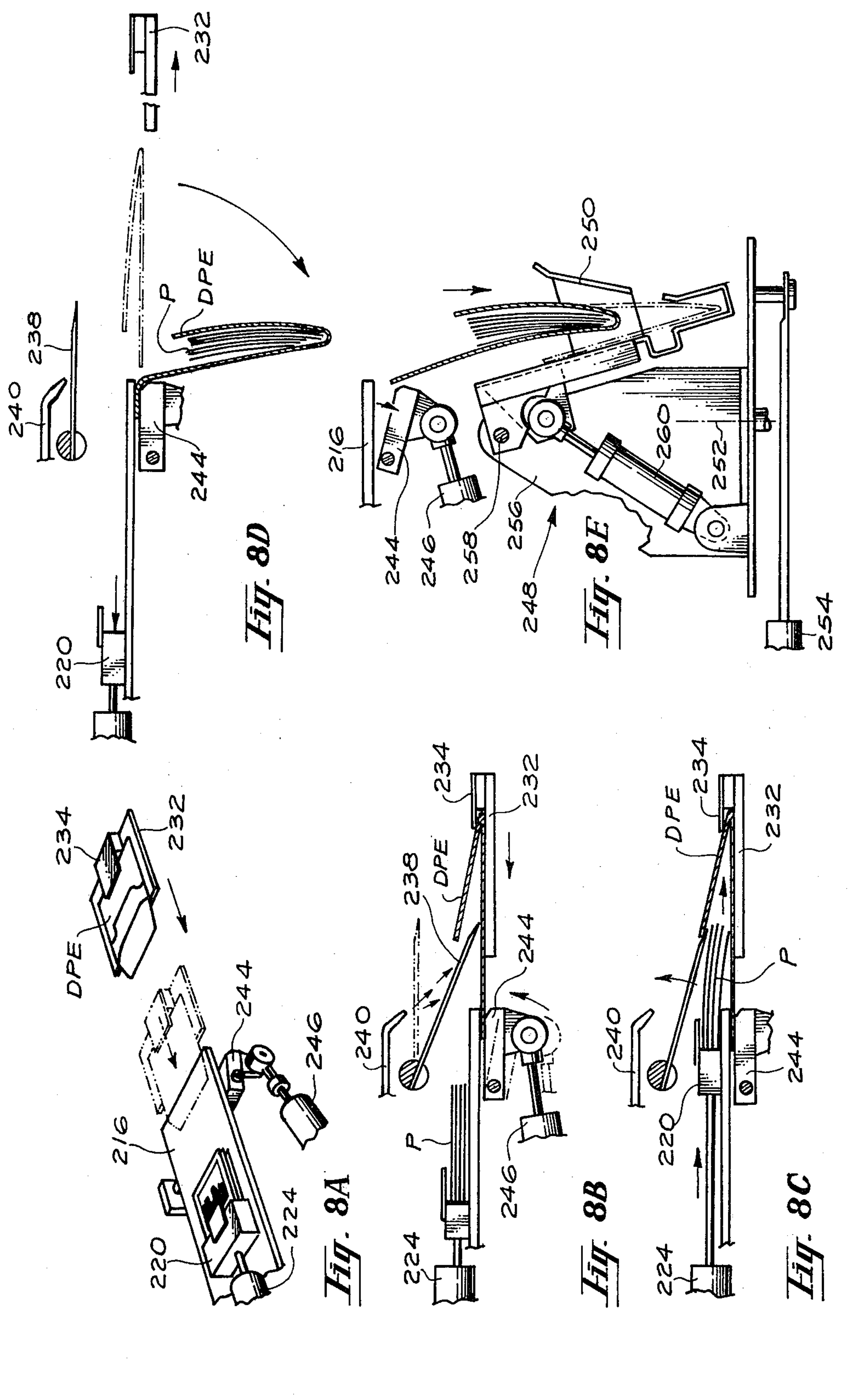
FIGS. 8A to 8G are a series of views depicting, in sequence, the operation of the transport assembly for the double pocket envelope.

The several steps involved in loading a stack of prints into the DPE is illustrated by FIGS. 8A to 8G, showing only those mechanical elements useful for understanding the operation of this portion of the apparatus. FIG. 8A shows in solid line the situation as it exists in FIG. 7. A stack of prints were pushed up the loading platform 216 and against the pusher block 220. Meanwhile a DPE has dropped upon the shuttle plate 232 up against the retainer 234. In the next step shown in broken line in FIG. 8A, the DPE is moved forward toward the loading platform 216. Note that the outward extending tab of the DPE is pushed into the space between the underside of the platform 216 and the tab lock plate 244. In FIG. 8B, momentarily before the DPE is in position, the DPE opener blade 238 has descended (as shown in solid line) and slipped into the pocket opening. At the same time, a stream of air is delivered from the air tube 240 to assist in opening the pocket. With the DPE in place, the tab lock plate 244 is shown to close against the platform 216, sandwiching the DPE tab therebetween.

Figures 8F, 8G:
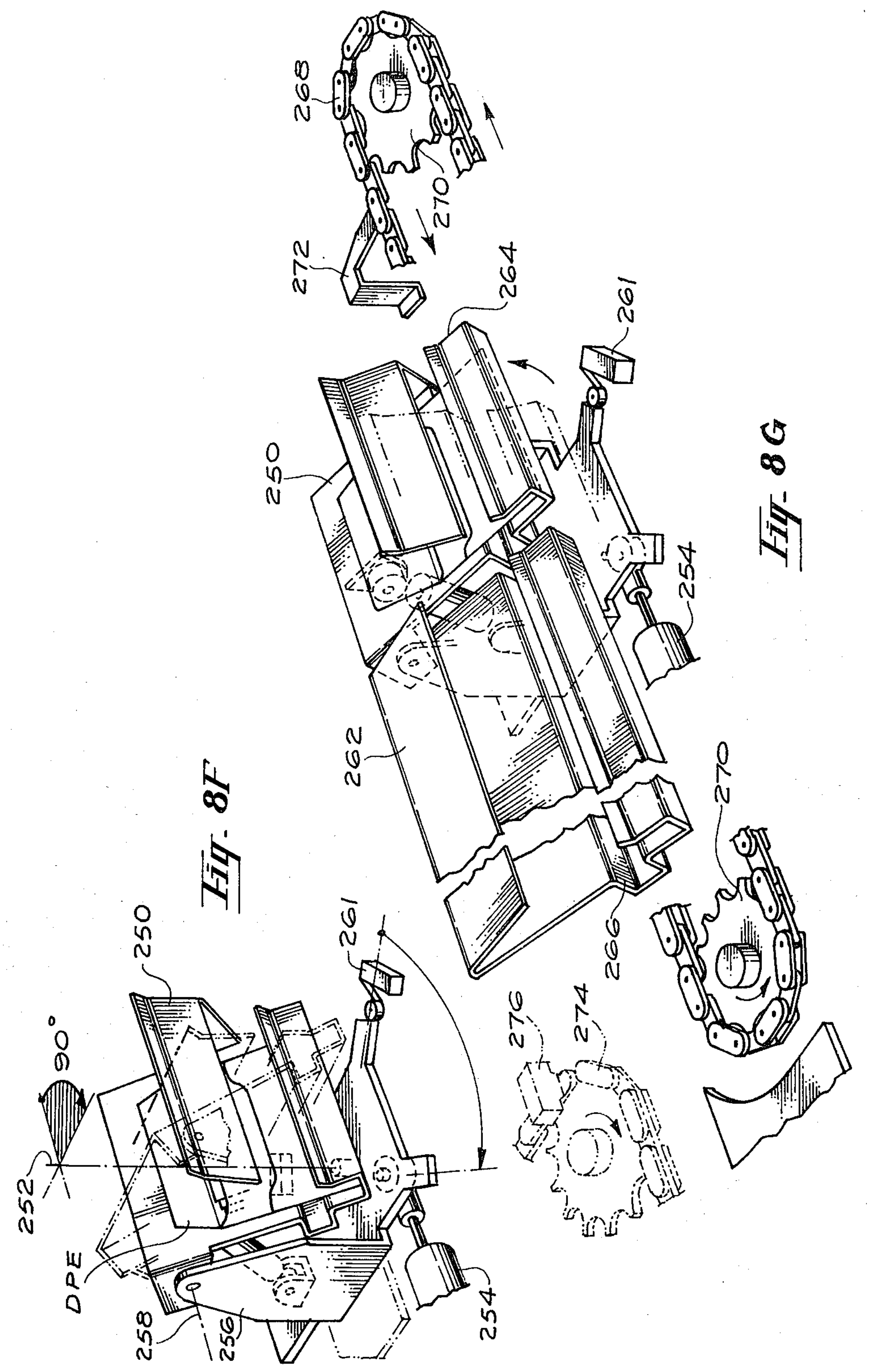

Then, as illustrated in FIG. 8C, the DPE opener blade 238 is driven upward to forcefully open the pocket of the DPE, allowing enough space for the stack of prints to pass unimpeded. The stuffer cylinder 224 is actuated, forcing the pusher block 220 toward the DPE and pushing the stack of prints into the open pocket of the DPE. As illustrated in FIG. 8D, the pusher block 220 and the DPE shuttle plate 232 are retracted to their former positions, allowing the DPE—now heavy with prints—to fall until restrained by the tab clamped by the lock plate 244. In so falling, the DPE hangs adjacent a rotate and pivot assembly 248 and inside a catch tray 250 (see FIG. 8E). The tab lock plate 244 is then retracted by the actuator assembly 246, allowing the filled DPE to fall into the catch tray 250. The assembly 248 is pivoted about an axis 252 by an actuator cylinder 254. A carriage 256 is provided on the pivotable assembly 248 for rotatably mounting the catch tray about a pivot 258. An actuator 260, mounted on the pivotable assembly 248, pivots the catch tray 250 into two positions—the catch position shown in FIG. 8E and the transfer position shown in FIG. 8G. Note that the function of the assembly 248 is to catch a downward oriented DPE, rotate the DPE (about axis 252) approximately 90° (as shown by FIG. 8F) and raise the DPE (about axis 258) until it is substantially in line with the next conveyor (shown in FIG. 8G). The limit of rotation about axis 252 is controlled by a microswitch 261, which signals the presence of the assembly 248 in either of its two positions.

Turning to FIG. 8G, the catch tray 250 is shown raised to be in line with a chute conveyor 262. The chute conveyor 262 is configured to match the catch tray 250, both having a folded-over lip 264 and a channel 266. A chain conveyor 268, mounted between two sprocket gears 270, is disposed relative the conveyor chute 262 such that a span of the chain traverses the chute 262 adjacent the lip 264. A pusher finger 272 extends from the chain conveyor 268 and is adapted to ride in the channel 266. In so doing, the finger 272 engages the DPE resting in the catch tray 250 and pushes it along the conveyor chute 262 to the DPE opener assembly 116. There the conveyor 268 stops while the operator inserts the customer filmstrips into the second, unfilled pocket of the DPE. This pocket is opened by a pair of pneumatic suction cups 278 mounted on a rotatable yoke 280 that is actuated by a cylinder assembly 282. Referring back to FIG. 4, the customer filmstrips are spliced end to end in a reel F′ mounted on the film cutter 118. The filmstrips are unreeled from the reel F′ through an array of rolls to the cutter 284. For orders not requiring any make-over printing, the filmstrip is chopped into short strips (usually three to five frames) and held for the operator on the tray 286. Filmstrips for orders requiring make-over printing are handled differently; the entire customer filmstrip is separated from the reel F′ and respliced to a make-over reel M′. To do this, the filmstrip is diverted through the turnaround 288 up to a splicer 290, where the end of the previous make-over filmstrip is located. There a splice is removed from the splice web S to fasten the adjoining filmstrips together. Then the reel M′ winds the filmstrip until the cut end is again stationed at the splicer 290. The splice substrate material is rewound upon the reel S′.

Figure 9:
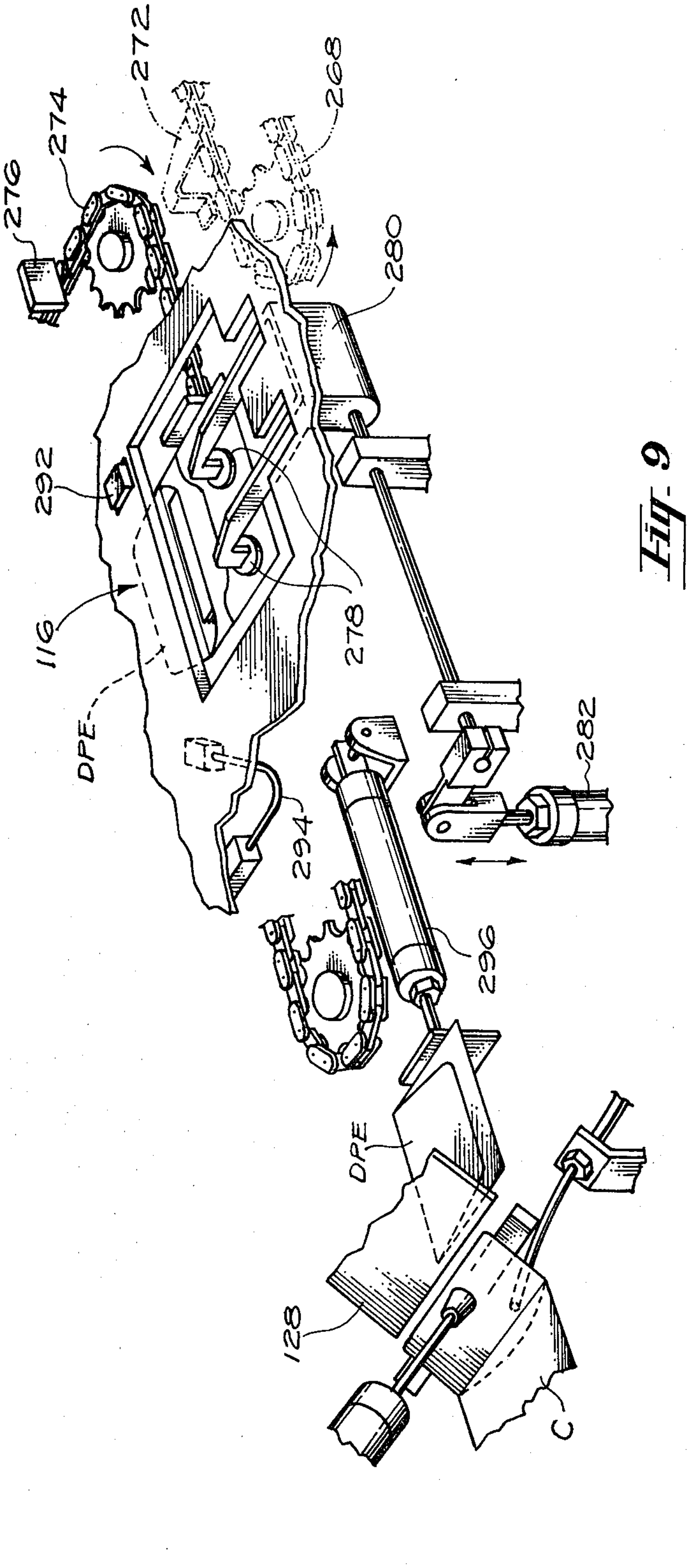
FIG. 9 is a view of the transport assembly of FIG. 8, showing a station for inserting negative filmstrips and apparatus for pushing the envelope into the customer package.

Once the operator has placed the cut filmstrips in the open pocket of the DPE at the DPE opener assembly 116 (referring to FIG. 9), the button 292 is depressed and a second chain conveyor 274 starts movement. Referring now to FIG. 9, the second chain conveyor 274 includes a pusher block 276 that engages the DPE and pushes it past a folding wire 294 that folds the flap tab over the DPE; the folded DPE is finally delivered to a DPE pusher assembly 296. As described earlier, the priced customer envelope is waiting for the DPE at the end of the envelope belt conveyor 128 (shown in phantom in FIG. 9). The assembly 296 pushes the folded DPE into the open customer envelope. Subsequent processing occurs as described in connection with FIG. 4 until the envelope C is finally stacked in one of the bins 140A to D.

Orders having prints needing make-over are packaged the same as passed prints and delivered to the customer envelope sorter assembly 138 (FIG. 4). There they are routed to a special bin (one of bins 140A to 140D). However the negative filmstrips are not placed into the DPE so that it is unnecessary to have the DPE stop at the DPE opener assembly 116. Prints incapable of correction are simply rejected at the print reject assembly 110; the DPE is subsequently packaged into the customer envelope as usual and sent to appropriate bins (140A to D) for shipment to the customer. The price label printer 132 is of a conventional design that is responsive to the computer 18 (see FIG. 3); paper chops are totalled for a customer order and then the total is reduced for any non-makeover prints discarded at the reject assembly 110. The computer 18 then calculates an appropriate price in a conventional manner and directs the label printer to print the total on the label.

FIG. 3 illustrates thee interface between the machine control computer 18 and the inspection workplace since this relationship is believed helpful in describing the preferred embodiment of the invention. While the precise interrelationship of the computer 18 and the remainder of the inspection and packaging workplace 12 has not been set forth in great detail, it is believed that an ordinarily skilled machine programmer can supply the required interface. Moreover, the correlation logic expressed in connection with FIG. 3 may be cast into many programming schemes, each suitable for the described results. The block diagram in FIG. 3 is merely illustrative of the logic involved and is not intended to place any constriction on the scheme of programming employed.

The invention has been described in detail with particular reference to a presently preferred embodiment thereof, but it will be understood that variations and modifications can be effected within the spirit and scope of the invention.

What is claimed is:

1. Apparatus for processing photographic prints through an inspection operation where particular prints made from corresponding photographic negatives are selected for remaking using recorded negative-related information, said apparatus comprising:
   - means for storing the negative-related information corresponding to the prints being inspected;
   - an inspection work surface having a plurality of identifiable positions for the prints;
   - means for positioning a plurality of the prints in at least some of the identifiable positions;
   - means for correlating the negative-related information with the identifiable positions in which prints corresponding to the negatives are positioned;
   - means for generating a selection signal corresponding to the position on said surface of a print selected for remaking; and
   - means responsive to said selection signal for retrieving negative-related information corresponding to the selected print for use in remaking of the print.

2. Apparatus for processing photographic prints through an inspection work station where particular prints having observable problems are selected for correction and their corresponding negatives are returned to a photographic printer, the selected prints being assembled into a work order that includes sequential negative-related information useful in operating the photographic printer, said apparatus comprising:
   - means for reading the sequential negative-related information corresponding to the prints being inspected;
   - an inspection surface having a plurality of identifiable print positions;
   - means for positioning a plurality of the prints in at least some of the identifiable positions; means for correlating the sequential negative-related information with the identifiable positions in which corresponding prints are positioned to establish a data base in which the negative information is identified with corresponding print positions;
   - means for generating a selection signal corresponding to a position in which a selected print is positioned;
   - means responsive to the selection signal for retrieving negative-related information correlated with the selected print position;
   - means for accumulating negative-related information for successive selected prints; and
   - means responsive to said accumulated negative related information for generating control information for use by a photographic printer in remaking of the selected prints.

3. Apparatus for combining printed photographic negatives, from filmstrips that may include unprinted negatives, with corresponding photographic prints into containers at a packaging workcenter utilizing prerecorded information identifying the printed and the unprinted negatives, said apparatus comprising:
   - means for advancing the filmstrips to the packaging workcenter;
   - means for advancing the prints to the packaging workcenter in synchronism with the filmstrips;
   - means for processing the pre-recorded information to distinguish the information identifying printed negatives from the information identifying the unprinted negatives;
   - means responsive to said processed pre-recorded information for matching prints with the corresponding printed negatives;
   - means cooperative with said matching means for generating signals identifying the negatives corresponding to the respective prints;
   - means for severing negatives from the filmstrips; and
   - means responsive to said signals for synchronously dispensing the severed negatives and the respective prints to the packaging station where the corresponding negatives and prints are packaged in the same container.

4. Apparatus for correlating a sequence of photographic prints located in a photograhic print finishing device with a corresponding sequence of negatives through use of sequential negative-related information generated during the printing of the negatives at a preceding printing operation, said apparatus comprising:
   - means associated with the print device for storing the negative-related information;
   - means for transferring the negative-related information from the printing operation to said storing means;
   - means for positioning the leading print in the sequence of prints relative to the corresponding leading negative in the sequence of negatives to provide a common beginning reference;
   - means for retrieving the negative-related information in sequential relationship with the commonly referenced prints and negatives thereby to provide the information in the same sequence as the prints;
   - means for advancing the prints through the photographic print finishing device; and
   - means for reading the negative-related information in synchronism with advancement of the prints to determine the identity of the negatives corresponding to the prints as the prints are being advanced.

5. Apparatus for processing photographic prints through an inspection work station where particular prints that do not conform to a predetermined quality standard are selected for correction and the corresponding negatives are returned to a photographic printer for reprinting; the selected prints being assembled into a work order that includes sequential negative-related information useful in operating the photographic printer, said apparatus comprising:
   - an inspection table having a plurality of identifiable print positions;
   - means for positioning a plurality of the prints in at least some of the identifiable positions;
   - means for reading the sequential negative-related information corresponding to the prints being inspected;
   - data buffer storage means for storing the sequential negative-related information specifically correlated to the identifiable positions in which corresponding prints are positioned;
   - means for generating a selection signal corresponding to a position in which a particular non-conforming print is positioned;

means responsive to the selection signal for retrieving from said data buffer storage the specific negative-related information correlated to the non-conforming print position; and means responsive to said specific negative-related information for generating control information for use by a photographic printer in reprinting.

6. Apparatus for processing a web of photographic prints through a finishing work station where the web is separated into individual prints and particular prints that do not conform to a predetermined quality standard are selected for correction, the work station further receiving negative-related data magnetically recorded during the printing of the web of photographic prints, said apparatus comprising:

an inspection station;

an actuatable inspection conveyor having a plurality of identifiable print positions;

means for actuating said inspection conveyor to move the print positions adjacent said inspection station;

means for positioning a plurality of the separated prints in at least some of the identifiable positions;

means for reading the negative-related data corresponding to the separated prints;

a magnetic working buffer;

means for entering the data into the magnetic working buffer in correlation with the identifiable positions in which corresponding prints are positioned;

means at said inspection station for generating a selection signal corresponding to a position in which a selected nonconforming print is positioned; and means responsive to the selection signal for retrieving from said working buffer specific negative-related data to identify the negative that produced the nonconforming print in the selected print position.

7. Apparatus for controlling a photographic operation by correlating a sequence of photographic prints included on a web of developed photographic paper with a corresponding sequence of negatives included on a strip of film through use of sequential negative-related data generated during the printing of the negatives, said apparatus comprising:

a data buffer for sequentially storing data; p1 means for storing the negative-related data in said buffer;

means for positioning the leading print in the sequence of prints relative to the corresponding leading negative in the sequence of negatives to provide a common beginning reference;

means for retrieving the negative-related data in sequential relation to the prints and negatives to thereby provide the data in sequence with the prints;

means for advancing the prints through the photographic operation; and means for sequentially reading the negative-related data in tandem relation with the advancing prints to identify negatives corresponding to the prints.

8. A method of assembling information for use in making over photographic prints obtained from a group of photographic negatives, said method comprising the steps of:

printing the negatives upon photosensitive paper to provide a sequence of latent images upon the paper corresponding to the negatives;

generating negative-related data during printing regarding the suitability of each negative for printing and the decision taken with respect thereto by the printer;

storing the negative-related data in a storage device;

processing the paper to provide a sequence of visible prints from the latent images of suitable negatives;

inspecting the prints for problems to identify selected prints that need to be made over;

generating identification signals for the selected prints that need to be made over;

synchronizing the identification signals with the negative-related data by considering the relative occurrence of data regarding printed and unprinted negatives;

retrieving the negative-related data corresponding to the selected prints; and generating corrective information from the negative-related data for use in adjusting a printer to correct the problems in the selected prints.

9. A method of inspecting photographic prints for problems and assembling instructions for controlling a photographic printer to provide duplicate prints that correct the problems, the original prints being produced from a group of negatives in accordance with printer control information generated for each of the negatives to control the exposing action or inaction of the printer respecting each negative; the method of comprising the steps of:

storing the printer control information for the series of negatives in a magnetic storage device;

observing the prints for problems;

selecting problem prints for making over;

providing signals representative of the observed problems in the selected prints;

synchronizing the signals respecting selected prints with the printer information regarding printed negatives by considering the relative occurrence of printer information regarding unprinted and printed negatives; and generating makeover instructions for providing new prints by combining the signals with the printer information for the negatives related to the problem prints.

10. A method of making photographic prints to facilitate the subsequent inspection of such prints for visual problems and to facilitate the preparation of instructions for controlling a photographic printer to make over such prints, the method comprising the steps of:

generating printer control information that initiates or prevents the printing of a negative;

printing a plurality of negatives upon photographic paper in accordance with the control information regarding each negative;

storing the printer control information in a computer storage device in the order of negative advancement through the printer;

processing the photographic paper to provide a plurality of photographic prints;

observing the prints for visual problems;

selecting problems prints for making over;

establishing identification signals representatives of the visual problems;

correlating the problem prints with their corresponding negatives by disregarding printer control information respecting unprinted negatives and matching the identification signals to the recorded printer control information respecting printed negatives;

generating signals representative of the problems observed in the prints; and generating makeover instructions for operating a printer by combining the signals representative of the problems with the printing information for the negatives correlated to the problem prints.

11. A method of identifying the location of a selected negative frame among a group of photographic negatives, a portion of the group of negatives being exposed to photosensitive paper in a photographic printer and the exposed paper being subsequently processed into photographic prints, said method comprising the steps of:

recording data indicative of the frame location of each negative relative other negative frames in the group of negatives;

positioning each of the prints made from the portion of the group of negatives in a predetermined sequence;

assigning a position identifier to each of the photographic prints;

correlating the recorded data indicative of the frame location of each negative with the corresponding position identifiers of respective photographic prints by considering the relative occurrence of data respecting printed and unprinted negatives;

establishing an identification signal for a particular print from the identifier corresponding to the particular print; and determining the location of the negative frame corresponding to the particular print by comparing the identification signal to the correlated frame location data to identify the corresponding negative frame.

12. A method of identifying the location of a particular negative included among a group of negatives including some negatives that are sequentially exposed upon photosensitive paper in a photographic printer and other negatives that are not exposed, the paper being subsequently processed to form a sequence of photographic prints, comprising the steps of:

generating negative position data during printing indicative of the position of each negative relative to other negatives among the group of negatives;

storing the negative position data in a first buffer storage in a computer;

placing the photographic prints in a plurality of separately identified print positions, respectively;

storing print position data in a second buffer in the computer;

comparing the data in said first and second buffers to correlate the negative position data with the print position data by considering the relative occurrence of data respecting negatives that were exposed and not exposed by the printer;

selecting a particular print for replacement; and extracting from the correlated data the position of the respective negative corresponding to the particular print.

13. A method of correcting the printing exposure of particular negatives included in a strip of negatives through reference to a series of photographic prints produced from the negatives, the negative strip having been exposed to a web of photosensitive paper in a photographic printer and the paper subsequently having been formed into prints, comprising the steps of:

generating negative data during printing indicative of the position of each negative in the negative strip;

storing the negative data in a storage device;

positioning the photographic prints in identified inspection positions;

generating print position data representative of location of prints in the identified inspection positions, respectively;

storing the print position data in a storage buffer;

comparing the negative data in the storage device to the print position data in the storage buffer to correlate consecutive print positions to the data describing respective negatives;

inspecting the prints for problems requiring correction;

deriving negative data for prints requiring correction by associating the respective print position data of the problem prints with respective data from the negative strip in the storage device;

modifying the derived negative data with additional data to indicate the problems in the prints; and assembling the modified negative data into a set of instructions for correcting the problem prints whereby a subsequent printer is controlled in accordance with the instructions to re-expose respective negatives corresponding to the problems prints.

14. A method of correlating a group of negatives with a group of prints made from the negatives, comprising the steps of:

generating negative signals representative of the sequential order of the negatives in the group;

storing the negative signals in an addressable storage device;

displaying the prints in the sequential order of their respective negatives;

providing an identity signal for a selected print to identify its sequential order in the displayed sequence of prints; and generating a print signal including the respective negative signal corresponding to the selected print by addressing the storage device with the identity signal of the selected print whereby the prints are continuously processed without visual examination of the group of negatives.

15. Apparatus for processing photographic prints through an inspection operation where particular prints made from corresponding photographic negatives are selected for remaking using recorded negative-related information, said apparatus comprising:

means for storing the negative-related information corresponding to the prints being inspected;

an inspection work surface having at least one identifiable position;

means for positioning a print in the identifiable position;

means for correlating the print in the identifiable position with the negative-related information corresponding to one of the negatives;

means for generating a make-over signal corresponding to a print selected for remaking that is positioned in the identifiable position on said surface; and means responsive to said make-over signal or retrieving negative-related information corresponding to the selected print for use in remaking of the print.

16. Apparatus for processing photographic prints through an inspection operation where particular prints made from corresponding photographic negatives are selected for remaking using sequentially-recorded negative-related information, said apparatus comprising:

means for storing the sequential negative-related information corresponding to the prints being inspected;

an inspection work surface having at least one identifiable position;

means for sequentially positioning the prints one by one in the identifiable position;

means for correlating each print in the identifiable position with the sequential negative-related information corresponding to the negatives;

means for generating a makeover signal corresponding to a print selected for remaking that is positioned in the identifiable position on said surface; and means responsive to said makeover signal for retrieving negative-related information corresponding to the selected print for use in remaking of the print.

* * * * *